United States Patent [19]
Nilsson

[11] Patent Number: 5,656,162
[45] Date of Patent: Aug. 12, 1997

[54] ROTATING FILTER

[76] Inventor: Harry Nilsson, Hauptstrasse 58, GH-8274 Tägerwilen, Switzerland

[21] Appl. No.: 535,012

[22] PCT Filed: May 4, 1994

[86] PCT No.: PCT/SE94/00409

§ 371 Date: Oct. 4, 1995

§ 102(e) Date: Oct. 4, 1995

[87] PCT Pub. No.: WO94/25140

PCT Pub. Date: Nov. 10, 1994

[30] Foreign Application Priority Data

May 5, 1993 [SE] Sweden .................................. 9301545

[51] Int. Cl.⁶ .................................................. B01D 33/46
[52] U.S. Cl. ....................... 210/236; 210/324; 210/327; 210/332; 210/334; 210/345; 210/396
[58] Field of Search ....................... 210/107, 324, 210/327, 332, 334, 345, 357, 396, 407, 236

[56] References Cited

U.S. PATENT DOCUMENTS

| | | | |
|---|---|---|---|
| 1,686,092 | 10/1928 | Manning | 210/327 |
| 2,269,725 | 1/1942 | Malanowski | 210/396 |
| 2,885,083 | 5/1959 | Peterson et al. | 210/396 |
| 3,814,260 | 6/1974 | Daubman et al. | 210/402 |
| 4,131,548 | 12/1978 | Peterson | 210/331 |
| 5,330,645 | 7/1994 | Geldmacher | 210/327 |

FOREIGN PATENT DOCUMENTS 2019732  11/1979  United Kingdom.

*Primary Examiner*—Peter A. Hruskoci
*Attorney, Agent, or Firm*—Quarles & Brady

[57] ABSTRACT

A rotating filter including a container (11) for a liquid or suspension to be filtered and a rotor structure (17, 21, 22, 25, 26) being provided at its outer periphery with a filter medium arranged in the shape of at least one circular ring (33) having its center in the rotational axis of the rotor structure and an extension in the radial direction substantially from the outer circumference of the rotor structure. Removal and discharge means (73, 93) is arranged radially outside the outer periphery of the rotor structure, extends substantially thereto along the radial extension of the filter medium and is adapted to remove filter cake material from the filter medium and lead it radially outward towards the radially outer limit of the filter medium.

18 Claims, 10 Drawing Sheets

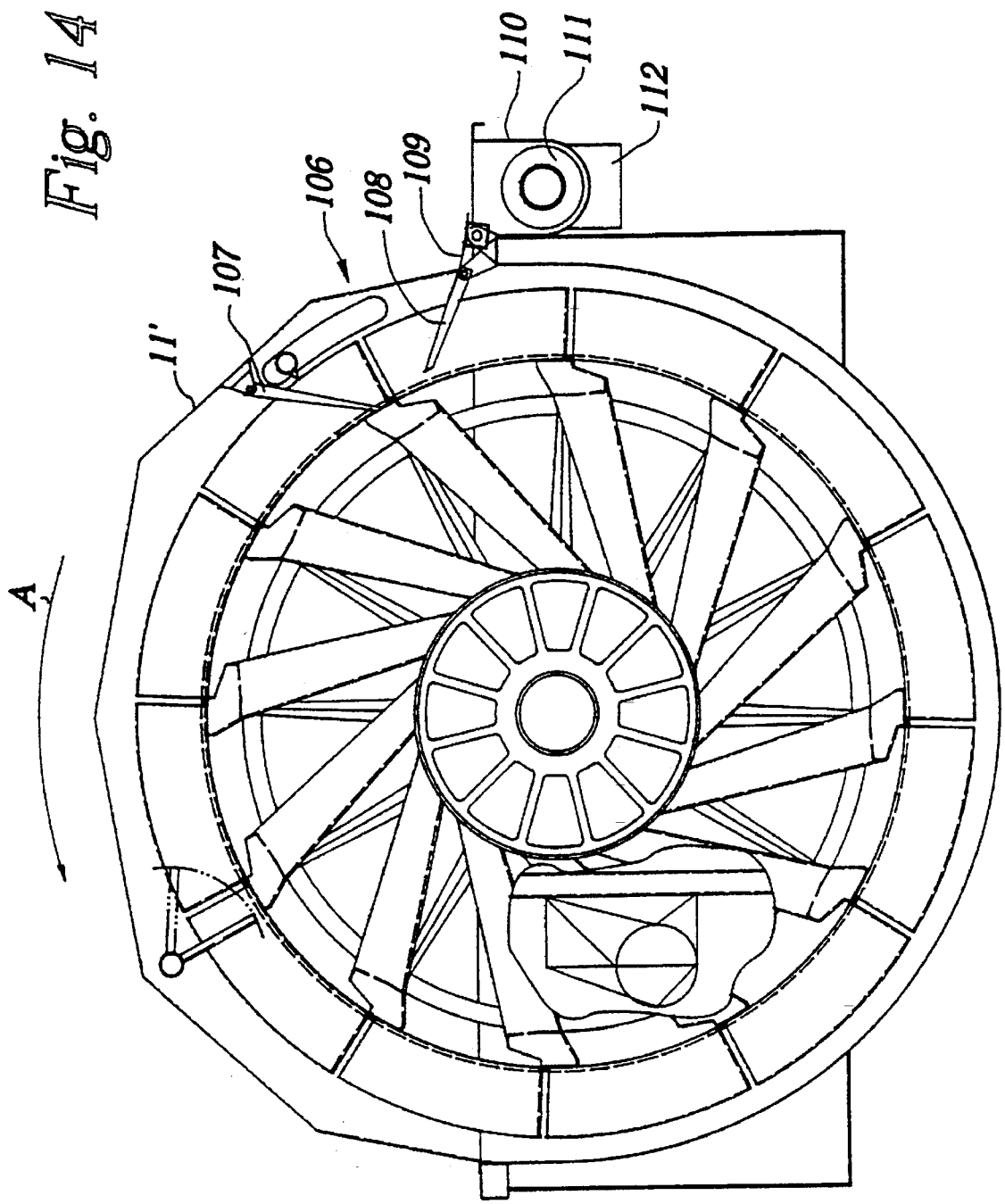

ROTATING FILTER

The present invention concerns a rotating filter including a container for a liquid or suspension to be filtered and a rotor structure arranged in the container, said rotor structure being provided at its outer periphery with a filter medium through which the liquid is filtered and on which material is deposited as a filter cake, said filter medium being arranged in the shape of an least one circular ring to having its centre in the rotational axis of the rotor structure and an extension in the radial direction substantially from the outer circumference of the rotor structure.

Ever since rotating filters came into use it has been a desire to construct filters having:

the largest possible filtering area on the smallest possible flooring area;

a high reliability in operation, particularly in regard of removal of filter cake;

a low manufacturing cost per area unit of filtering area.

Among rotating filters, three main groups can be distinguished, viz., drum filters having a smooth cylindrical filtering surface (smooth drum filters), drum filters having a ridged filtering surface (ridged drum filters), and, disc filters.

Simple, relatively fast rotating smooth drum filters have been used for dewatering of suspensions, such as pulp, up to typically 2% dry content, and such filters completed with filtrate channels connected to a source of vacuum have been used for washing and bleaching of pulp, sometimes further completed with a counter cylinder to obtain a dry content of about 15%. Filter cake removal from a smooth drum filter is a relatively uncomplicated operation utilizing a simple scraper. However, should the filtering medium, generally a filter cloth, be torn or otherwise damaged, the entire cloth must be replaced.

With the demand for increasing filtering capacity, ridged drum filters were developed and have been used for fiber recovery and dewatering up to about 2% dry content. With ridged drum filters, disclosed in, e.g., SE-B-315,490, filtering areas of about 2.5 times that of a smooth drum filter having the same outer diameter and axial length have been achieved. Due to the ridged filtering surface, it has not been practicable to use mechanical devices for filter cake removal, since such use would have involved an evident risk of damaging the filter medium comprising a filter cloth continuously extending over several adjacent ridges and valleys of the drum circumference. In practice, filter cake removal involves the use of liquid spray devices, resulting in unwanted dilution of the removed filter cake material.

Disc filters, used for fiber recovery and dewatering up to about 15% dry content, provide filtering areas of about 5 to 7 times the filtering area of a smooth drum filter. One advantage with disc filters is that each single filter sector of a filter disc has its own filter cloth, meaning that, in case of damage, only that particular filter cloth has to be replaced. However, the increasing filtering areas have resulted in operational drawbacks, such as the necessity to use spray devices for filter cake removal, at the same time as the cost per filtering area unit has become high.

The present invention aims at providing a rotating filter combining the best features of drum filters and disc filters, particularly in regard of filtering capacity, filtering area related to diameter and length, and, reliability of operation, but avoiding the drawbacks of conventional drum filters and disc filters. Particularly, the new filter shall allow mechanical removal of filter cake without primarily requiring water or other liquid spray.

In reaching its aim, the present invention provides a rotating filter including a container for a liquid or suspension to be filtered and a rotor structure arranged in the container, said rotor structure being provided at its outer periphery with a filter medium through which the liquid is filtered and on which material is deposited as a filter cake, said filter medium being arranged in the shape of at least one circular ring having its centre in the rotational axis of the rotor structure and an extension in the radial direction substantially from the outer periphery of the rotor structure, said filter being charcterized in that removal and discharge means being arranged radially outside the outer periphery of the rotor structure, extending substantially thereto along the radial extension of the filter medium and being adapted to remove filter cake material from the filter medium and lead the filter cake material radially outwards towards the radially outer limit of the filter medium.

In a preferred embodiment of the invention the rotor structure carries at its outer periphery a plurality of filter elements communicating through conduits in the rotor structure with a filtrate outlet of the filter, each filter element substantially having the shape of a ring segment having a base portion and at least two filter surfaces extending radially outwards from the base portion, and said filter elements constituting at least one substantially closed filter ring having an inner an outer circumference. This embodiment is characterized in that the removal and discharge means is arranged radially outside the rotor structure and extends from a position radially outside said outer circumference of the filter ring to a position substantially at its inner circumference, said removal and discharge means being adapted to remove filter cake material from an least one filter surface of the filter elements of at least one filter ring and to lead removed filter cake material to a position radially outside the outer.

BRIEF DESCRIPTION OF THE DRAWINGS

FIG. 14 is a cross-section corresponding to that according to FIG. 8 taken through another embodiment of the present invention.

Figure 1:
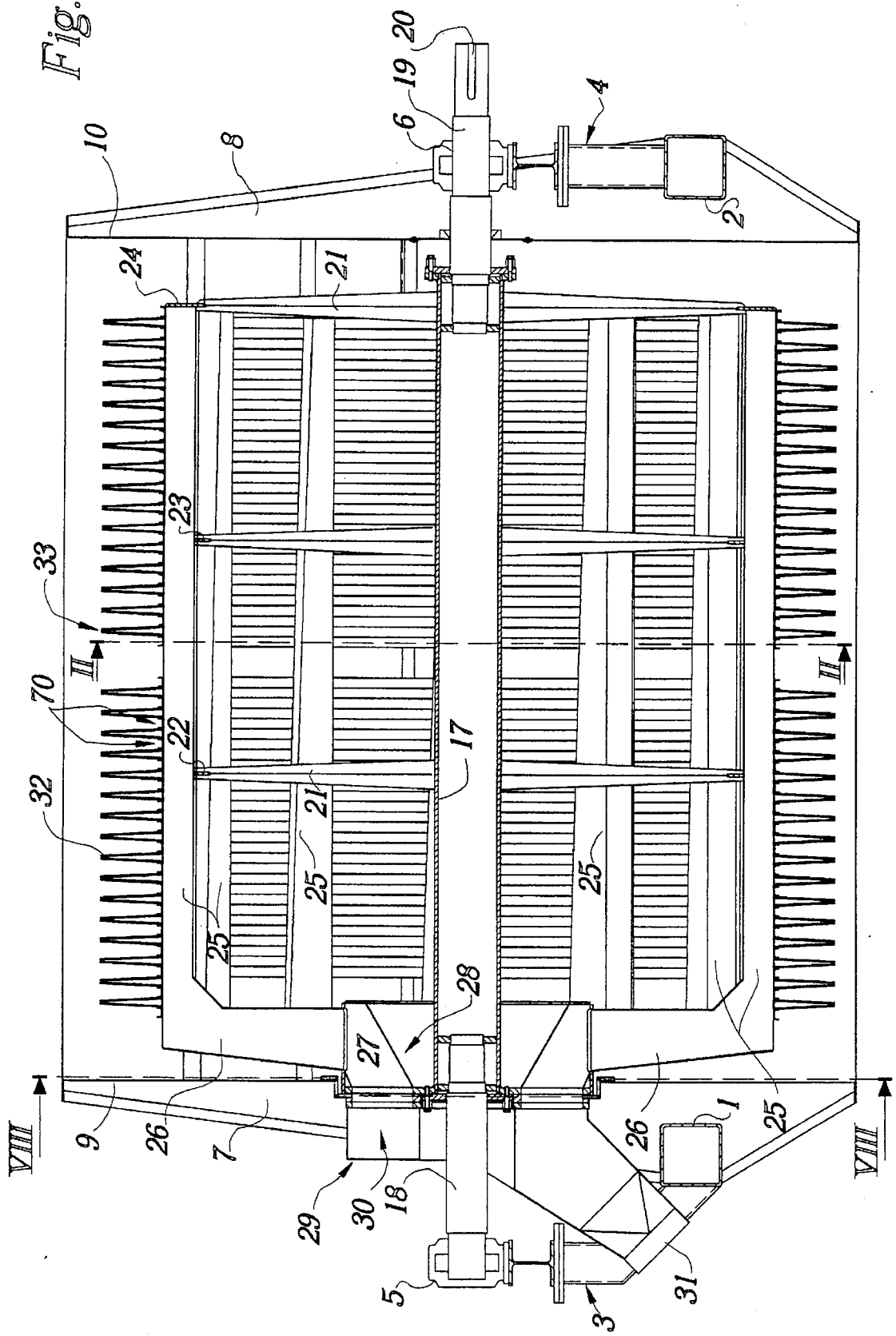
FIG. 1 is a vertical axial section taken through a rotating filter according to the present invention, showing particularly the rotor structure of the filter.
Figure 11:
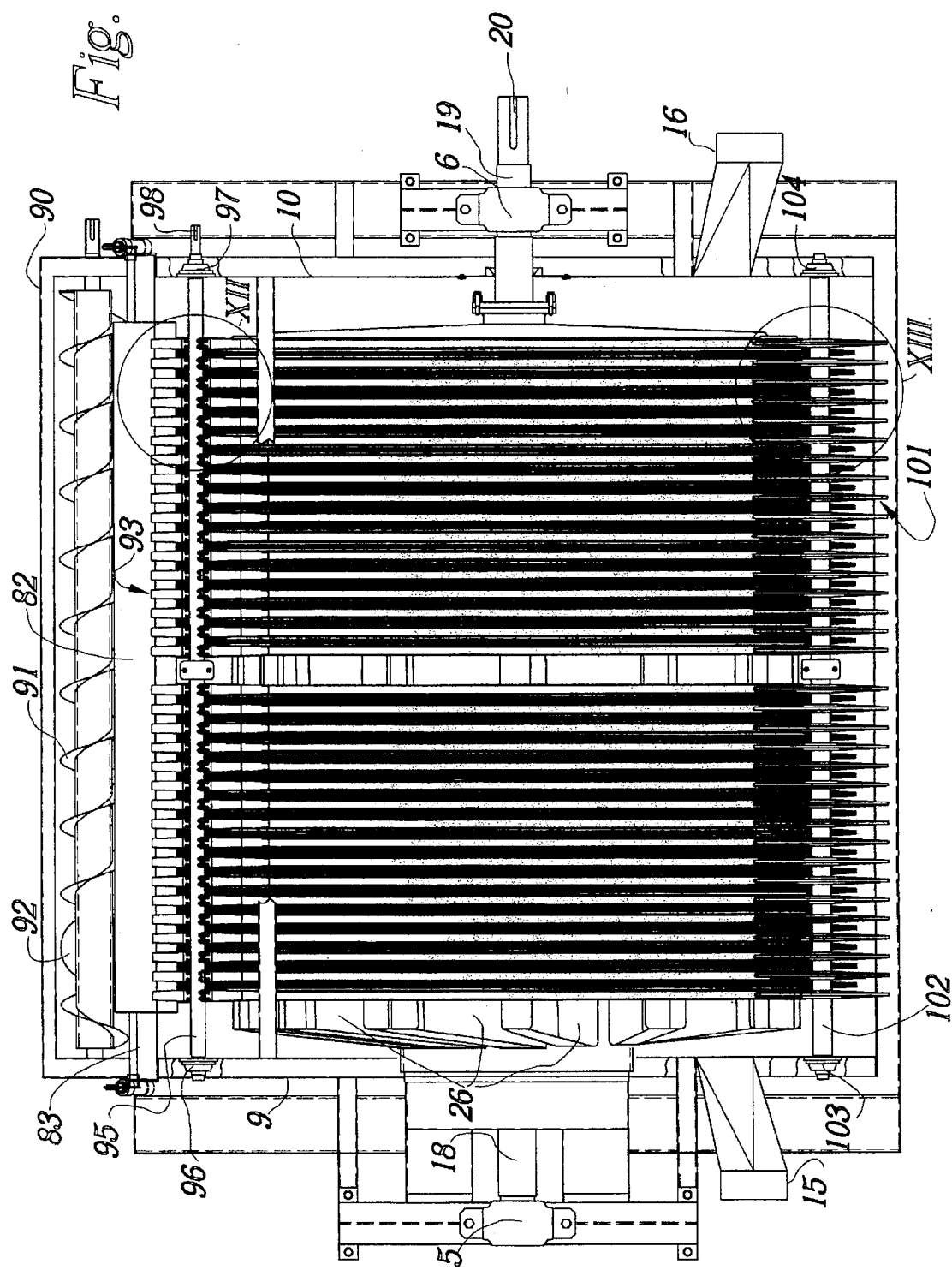
FIG. 11 is a plan view of the filter of FIG. 8 with removed cover.
Figure 13:
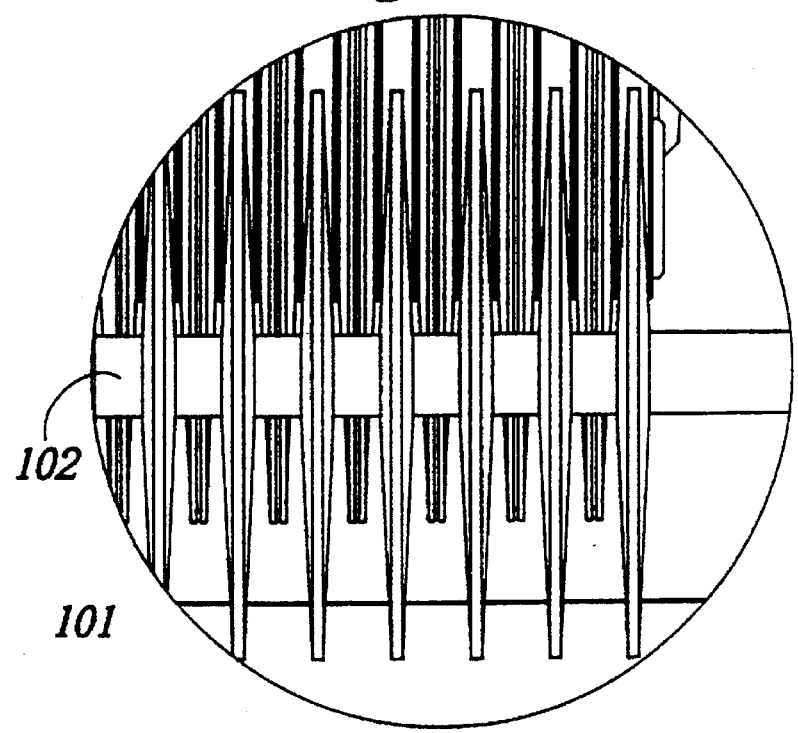
FIG. 13 is the encircled portion XIII of FIG. 11 at an enlarged scale.

The rotating filter according to the present invention includes a support structure comprising longitudinal beams (not shown) and spaced cross beams 1 and 2. The cross beams carry support structures 3 and 4 for bearings 5 and 6 (FIGS. 1 and 11). Rigidly connected to the cross beams 1 and 2 are vertical stiffening plates 7 and 8 for end walls 9 and 10 of a container 11 having a substantially semi-cylindrical bottom wall 12 (FIG. 8) terminating in vertical side wall portions 13 and 14. A removable cover is indicated 11'. Inlets 15 and 16 (FIG. 11) for a liquid to be filtered extend through the respective end wall 9 and 10.

Figure 2:
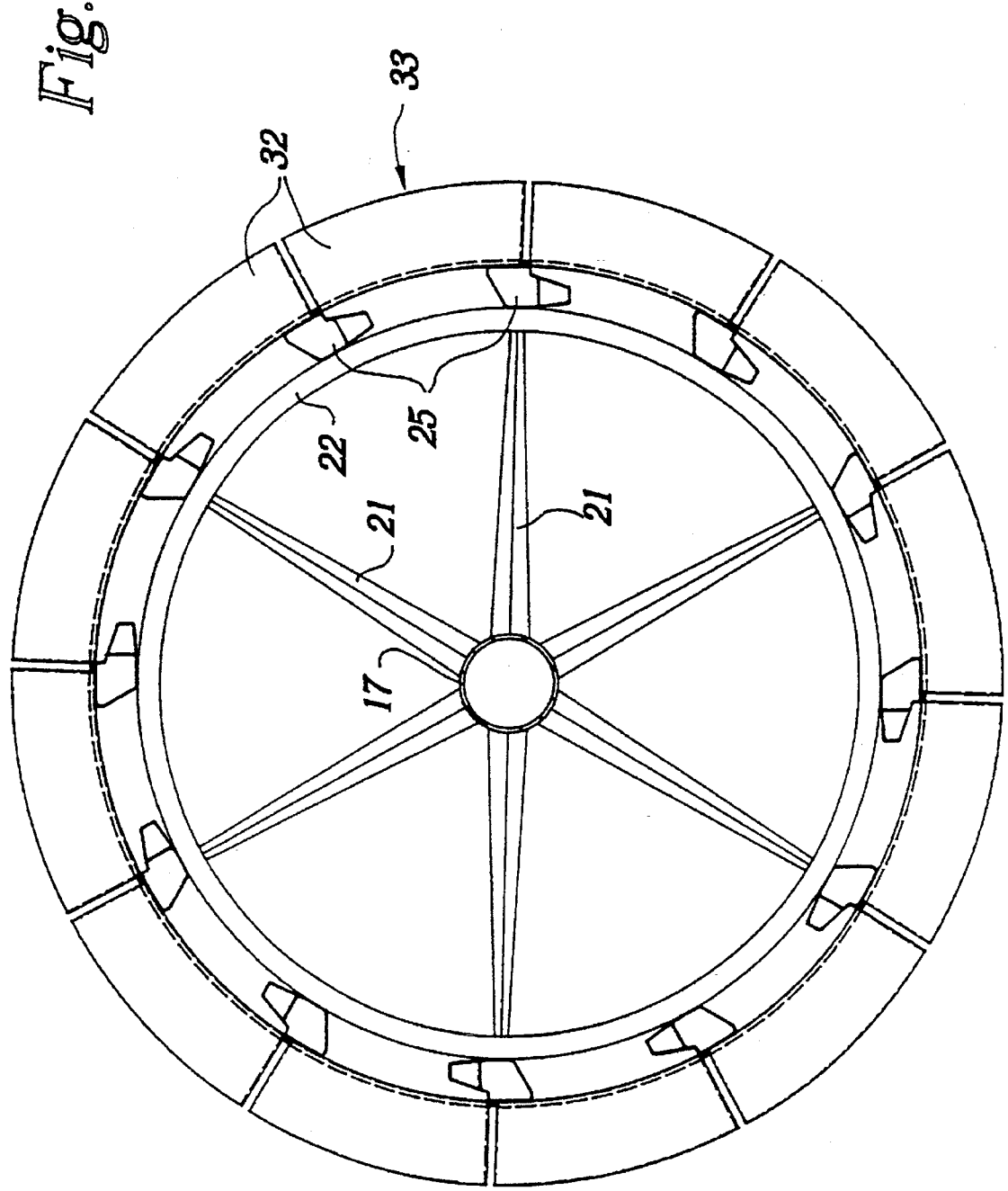
FIG. 2 is a cross-section taken along line II—II in FIG. 1 through the rotor structure of FIG. 1.

A shaft 17 extends centrally within the container 11 and has stub ends 18 and 19 extending through the end walls 9 and 10 and journalled in the bearings 5 and 6. Stub end 19 has a keyway 20 for positive rotational engagement with any conventional drive means, such as a pulley, for imparting a rotational movement to the shaft 15. As best seen in FIGS. 1 and 2, the shaft 17 carries radially extending spokes 21 evenly distributed in the circumferential direction of the shaft and arranged in groups spaced along the shaft. In the embodiment shown, there are six spokes in each group and there are three groups of spokes. Each group of spokes carries at the radially outer ends of the spokes a circular support ring 22, 23, 24, respectively, two rings 22 and 23, as well as the associated groups of spokes, being evenly spaced about the middle of the shaft 17, and the third ring 24, as well as its associated group of spokes, being located near end wall 10.

At the outer circumferences of the support rings 22, 23 and 24 are attached axially extending filtrate channels 25. In the embodiment shown, there are twelve filtrate channels evenly distributed about the circumference of the support rings. As seen in FIG. 1, support ring 24 extends in the radial direction so as to form a closure for the ends of the filtrate channels 25 facing the end wall 10. In their opposite ends facing the end wall 9, the filtrate channels turn into substantially radially inwardly directed legs 26 opening in a respective compartment 27 of the rotatable part 28 of a conventional filtrate valve 29, the stationary part 30 of which tightly extends through the end wall 9 and is provided with a filtrate outlet 31. The rotatable part 28 being firmly attached to the shaft 17, rotation of shaft 17 brings one leg 26 and the corresponding filtrate channel 25 after the other in fluid communication with the outlet 31.

The shaft 17, spokes 21, support rings 22, 23, 24, axial filtrate channels 25, legs 26 and rotatable filtrate valve part 28 form a rotor structure carrying at its outer circumference a plurality of filter elements 32 communicating with the axial filtrate channels 25. More precisely, the filter elements are arranged in a plurality of axially spaced rings 33 of filter elements (FIG. 1), the plane of each ring being perpendicular to the shaft 17. Each ring 33 comprises a number of filter elements 32 corresponding to the number of axial filtrate channels 25, in the embodiment shown twelve filter elements, the elements of each ring being equally circumferentially spaced (FIG. 2) such that elements of the rings having a certain angular orientation relative to the shaft 17 are connected to the same axial filtrate channel 25.

Figure 3:
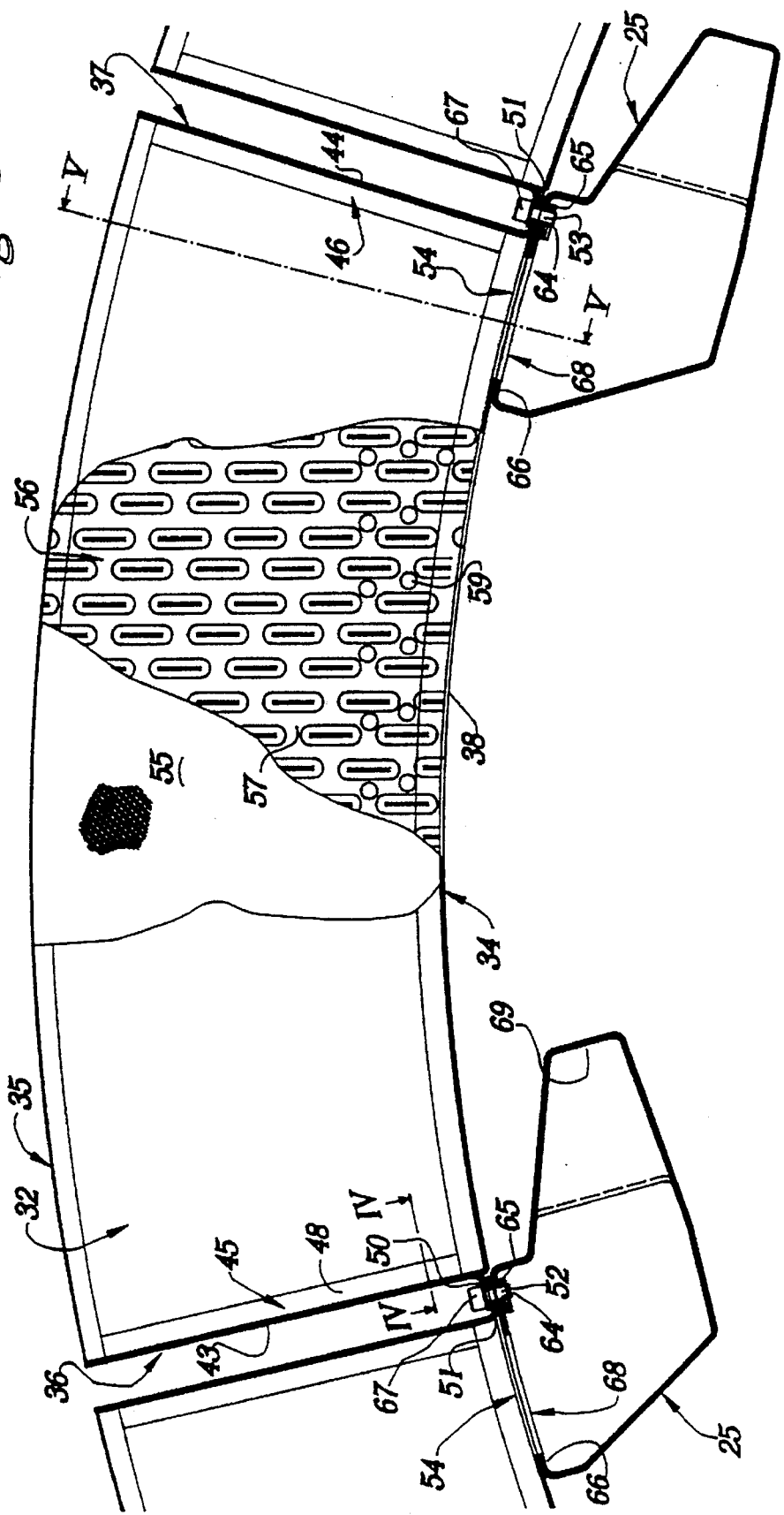
FIG. 3 is an axial view of a portion of a ring of filter elements showing particularly the arrangement of a preferred embodiment filter elements.
Figure 5:
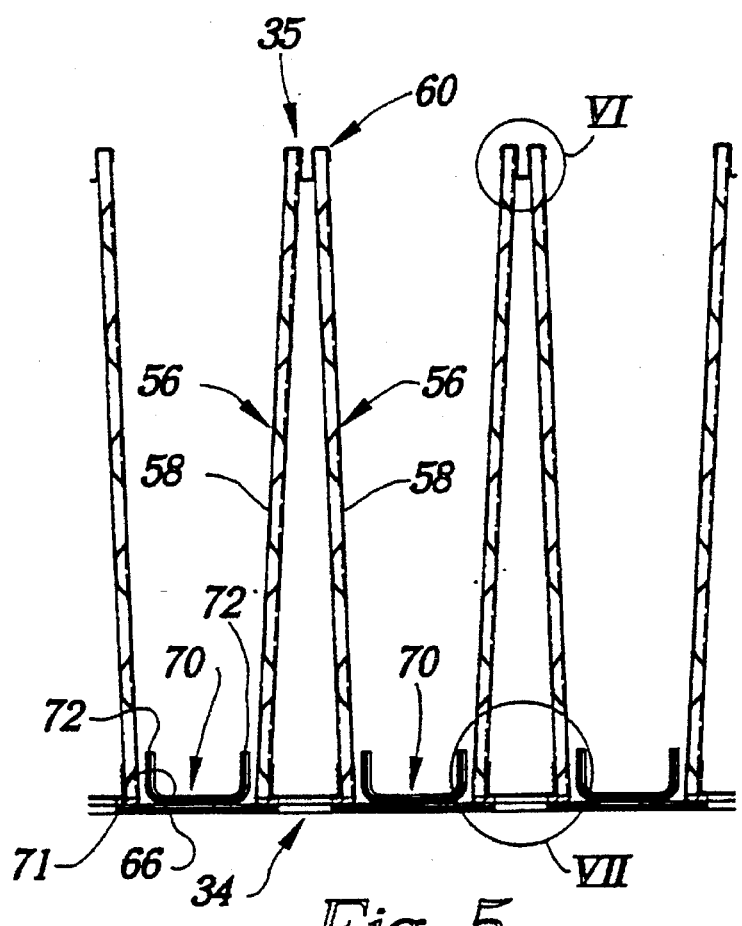
FIG. 5 is a section at an enlarged scale taken along line V—V in FIG. 3.

Each filter element 32 has the shape of a ring segment (FIG. 3) extending between adjacent axial filtrate channels and including a radially inner circumference portion or bottom portion 34, a radially outer circumference portion or top portion 35, and substantially radial end walls 36 and 37. In the embodiment shown, and as best seen in FIG. 5, each filter element has a substantially isosceles triangular cross-section, as seen in the circumferential direction, including a base (bottom portion 34) and two sides merging at the top portion 35. It appears, thus, that the filter described has a peripheral configuration resembling that of a ridged drum filter.

Figure 7:
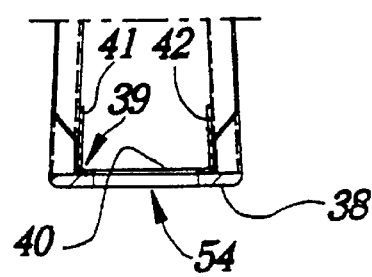
FIG. 7 is an enlargement of the area VII in FIG. 5.

The bottom portion 34 of a filter element comprises an arcuately curved bottom plate 38 and a U-section 39 extending along the circumferential length of the plate 38. The web portion 40 of the U-section 39 is centrally attached to the plate 38, such as by spot welding, and its flange portions 41, 42 extend radially outwards from the bottom plate 38 (FIG. 7). Each end wall 36, 37 of a filter element comprises a substantially triangular end plate 43, 44, respectively, and a likewise substantially triangular U-section 45, 46, respectively. The web portion 47 of the respective U-section 45, 46 is centrally attached to the respective plate 43, 44, such as by spot welding, and the flange portions 48, 49 thereof extend from the respective plate 43, 44 in directions towards each other. The radially inner ends of the flange portions 48, 49 are rigidly connected to the ends of the flange portions 41, 42 of the U-section 39, such as by spot welding, so that the U-section 39, together with the bottom plate 38, and the U-sections 45, 46, together with their end plates 43, 44, form a relatively rigid U-shaped frame structure. The radially inner ends of the end plates 43, 44 are outwardly bent in the circumferential direction of the filter element so as to form attachment lugs 50, 51, respectively, provided with respective holes 52, 53.

Close to one end of the filter element, which is the trailing end at rotation of the rotor structure, a filtrate outlet opening 54 is provided through the web portion 40 of the U-section 39 and the bottom plate 38.

To support a filter cloth 55 or the like filtering medium (only partially shown in FIG. 3), a rigid, plate-shaped element 56, having a main plane 57, extends from the bottom portion 34 to the top portion 35 on each side of the filter element. Also the plate-shaped element is only partially shown in FIG. 3. Preferably, and as is well known in the art, the plate-shaped element is formed with spaced ridges or bulbs 58 keeping the filter medium spaced from the main plane 57 of the element. Holes 59 are provided in the main planes 57 of the plate-shaped elements to enable filtrate flowing through the filter medium and between the ridges or bulbs 58 to reach the interior space of the filter element between the plate shaped elements 56. The main planes 57 of the plate-shaped elements 56 are rigidly attached to respective flange portions 41, 42 of the U-section 39 as well as to respective flange portions 48, 49 of the U-sections 45, 46, such as by spot welding.

Figure 6:
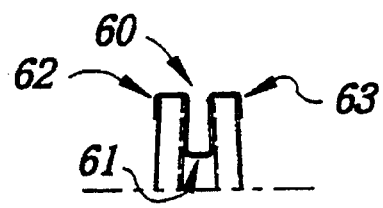
FIG. 6 is an enlargement of the area VI in FIG. 5.
Figure 4:
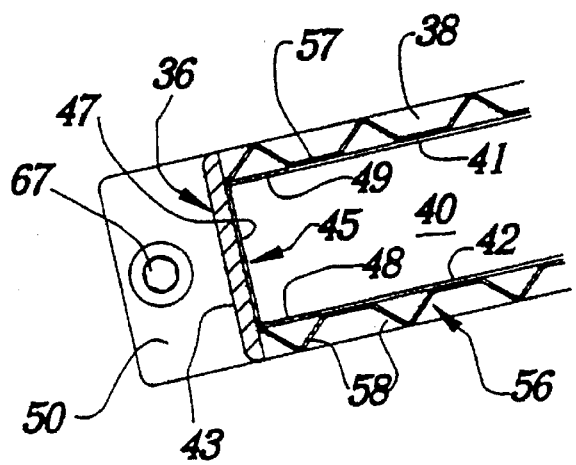
FIG. 4 is a section at an enlarged scale taken along line IV—IV in FIG. 3.

At the top portion 35 of the filter element, the radially outer edges of the plate-shaped elements 56 are engaged by a spacing and connecting means 60, including a central, U-shaped portion 61 and two inverted U-shaped lateral portions 62, 63 (FIG. 6). The central portion 61 is interposed between the outer edges of the plate-shaped elements 56 and the lateral portions 62, 63 firmly grip around the outer edges, thereby—together with non-shown sealing means—ensuring a fluid tight seal at the top portion of the filter element. The filter cloth 55 extends from the bottom portion 34 at one side of the filter element, over the spacing and connecting means 60, to the bottom portion at the other side of the filter element.

The filter element 32 is mounted at the rotor structure by attaching its attachments lugs 50, 51 to adjacent axial filtrate channels 25. For that purpose, holes 64 corresponding to the holes 52, 53 in the attachment lugs, are provided in the axial filtrate channels. In the embodiment shown, the holes 64 are through holes, and a threaded means such as a nut 65 is secured to the interior side of the radially outer wall 66 of the axial filtrate channels. Screws 67 extend through respective holes 52, 53 and 64, and are threaded into the nuts 65. In practice, attachment lugs 51, 52 of adjacent ends of adjacent filter elements overlap each other such that their respective holes 52, 53 align and one screw 67 may be used for attachment of each pair of overlapping lugs 51, 52. In its attached position, the filter element is positioned such that the filtrate outlet opening 54 thereof is aligned with a corresponding opening 68 provided in a radially outer wall 66 of the axial filtrate channel 25.

The filtrate outlet 31 is connected to sub-pressure, such as a barometric leg and/or a source of vacuum. Upon rotation of the rotor structure, the interior of each filter element in consecutive axial rows of filter elements are successively brougt into communication with said sub-pressure. Consequently, when the rings of filter elements rotate through a liquid or suspension introduced into the container 11 up to a predetermined level defined by the upper edges of the vertical side wall portions 13 and 14 of the container 11, solid particles thereof are deposited on the filter medium, whereas filtrate penetrating therethrough is received in the interior of the filter elements. Filtrate then flows into an axial filtrate channel 25 through the openings 54 and 68. Each axial filtrate channel has one wall 69, being the trailing wall at rotation of the rotor structure, which is not parallel to a plane through the shaft 15, but inclined thereto such that said wall slopes downwardly towards a corresponding leg 26 in rotational positions of the rotor structure wherein said wall is located in, or, close to, a horizontal plane through the shaft 17. All other walls of the axial filtrate channels being substantially parallel to the shaft 15, the inclination of the trailing wall 69 results in an increasing cross-section and a correspondingly increasing flow capacity of the axial filtrate channels towards the legs 26.

According to the present invention, axially spaced ring-shaped means 70 are evenly distributed along the axial direction of the rotor structure and are secured to the outer circumference thereof. More precisely, these ring-shaped means have a first purpose of serving as spacing means between adjacent rings 33 of filter elements. Accordingly, each ring-shaped means 70 has its central plane located perpendicularly to the shaft 17 and has a predetermined axial extension. In the preferred embodiment and as best seen in FIG. 5, each ring-shaped means has the cross-sectional shape of a U-section, the web portion 71 of which is fixed to the outer circumference of the rotor structure, viz., to the radially outer walls 66 of the axial filtrate channels 25, and the flange portions 72 of which define the axial distance between adjacent rings 33 of filter elements. The axial spacing between adjacent ring-shaped means 70 is adapted to the width, or, axial extension, of the bottom portion 34 of the filter elements, i.e., to the width of the bottom plates 38 and to the radially inner portion of the filter elements provided with plate-shaped elements 56, such that the position of each filter element and each ring of filter elements is accurately positioned in a well defined plane perpendicular to the shaft 17.

Solid particles deposited on the filter medium of a filter element during rotation under the liquid level form a filter cake which is partly dried during passage of the filter element above the liquid level and which is to be removed before the filter element is again submerged into the liquid in the container. According to the present invention, filter cake removal means is arranged radially outside the rotor structure.

Figure 8:
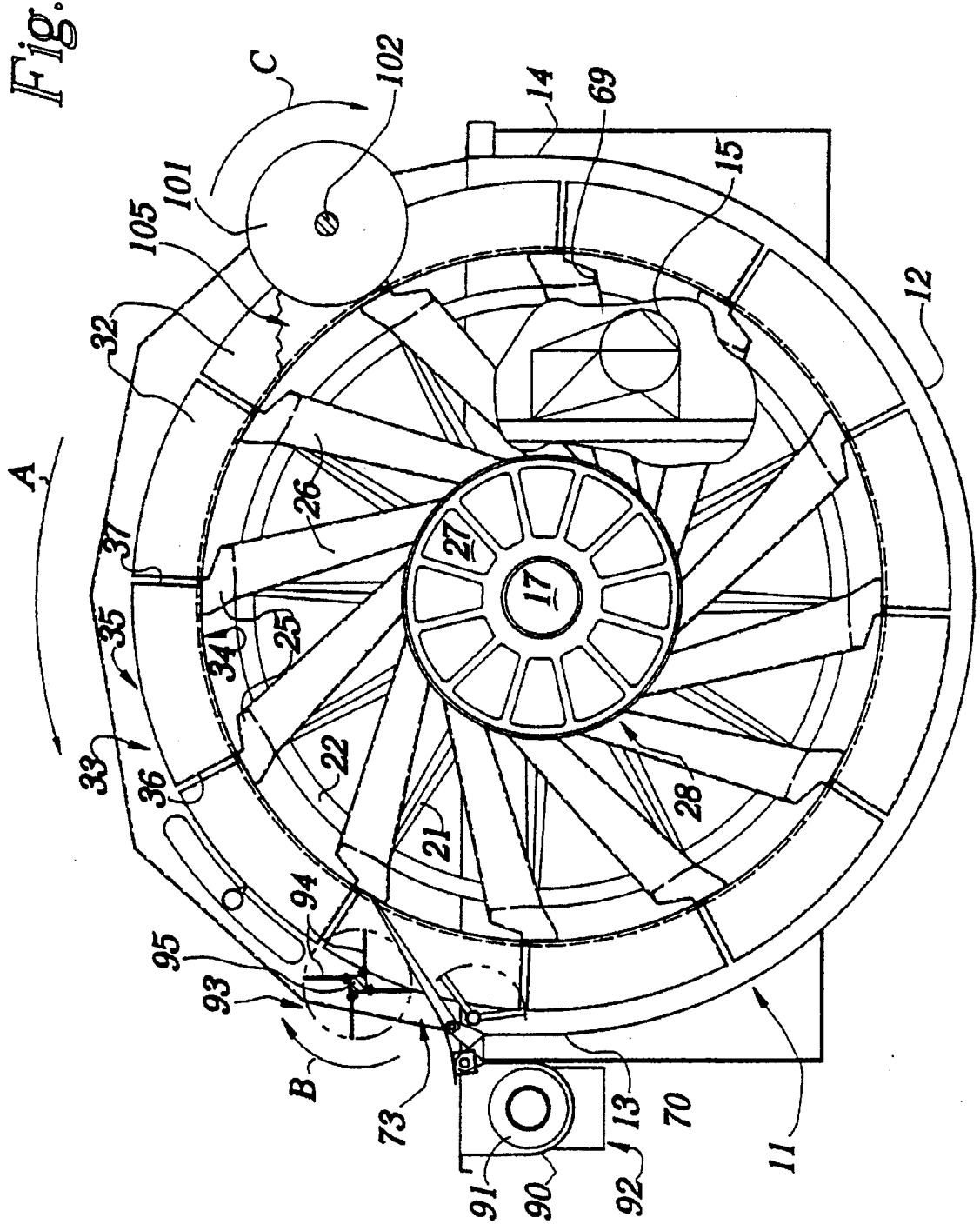
FIG. 8 is a cross-section taken along line VIII—VIII in FIG. 1 through a filter according to the present invention.

An embodiment of such removal means is shown in FIG. 8 and includes one scraper 73 for removal of filter cake from facing filtering surfaces of adjacent filter elements. The scraper arrangement is shown in greater detail in FIGS. 9 and 10.

Each scraper 73 comprises an elongated member having a base end 74 and a tip end 75. For adaption to the space between adjacent filter elements 32, the scraper tapers from the base end 74 towards the tip end 75 such that its axial edges are positioned close to the opposed filtering surfaces of adjacent filter elements. For stiffening purposes, the scraper has a U-shaped cross-section, in the embodiment shown inverted, the flange portions 76, 77 of which taper from the base end 74 towards the tip end 75, and the web portion 78 of which forms the main plane of the scraper. The scraper is pivotedly mounted in a position radially outside the outer circumference of the rings 33 of filter elements so as to be pivotable about an axis 79 parallel to the shaft 17. More precisely, the scraper is pivotable in a plane perpendicular to the shaft 17, parallel to the central planes of two adjacent rings of filter elements and located intermediate said planes. This plane is also the central plane of a previously described ring-shaped means 70.

In the embodiment shown, at leat one first bracket 80 is attached to an upper edge 13' of the side wall portion 13 and carries a shaft 81 extending through the flange portions 76, 77 of the scraper 73 at the base end 74 thereof. The radial distance between the radially inner circumference portions 34 of the filter elements and the axis 79 is less than the length of the scraper such that the tip end 75 thereof abuts the radially outer surface of the web portion 71 of the ring-shaped means 70 in a pivotal position of the scraper in which its main plane 78 forms an acute angle with a radius through the point of abutment.

The tip end 75 of the scraper has a width, i.e., an extension in the axial direction of the shaft 17, corresponding to the axial distance between the flange portions 72 of the ring-shaped means 70. In practice, the width of the tip end 75 is somewhat smaller than said axial distance so as to allow sliding relative movement between the tip end and the ring-shaped means 70 without interference. It is evident, thus, that the flange portions 72 of the ring-shaped means 70, serving as a spacing means between adjacent rings 33 of filter elements, also serve as a guide means for guiding the tip end 75 of the scraper in the axial directions. Further, the web portion 71 of the ring-shaped means provides a cylindrical cam surface guiding the tip end 75 in the radial direction. Altogether, the ring-shaped means 70 provides a smooth, uninterrupted axial and radial guide means for the tip end of the scraper irrespective of the interrupted shape of the rings 33 of filter elements.

Due to the fact that the filter elements 32 are attached to the outer circumference of the rotor structure, as are the ring-shaped means 70, now referred to as guide means 70, any ovality or other irregularity of the rotor structure will be transferred not only to the rings of filter elements but also no the guide means, and, consequently, to the tip end of the scraper. Likewise, since the guide means 70, also serving as spacing means between adjacent rings of filter elements, define the axial positions of the filter elements, any warping of the ring-shaped spacing means will also be present in the associated rings of filter elements. As a result, removal of filter cake material from facing sides of adjacent filter elements will be carried out in a most reliable manner since axial as well as radial variations from a true circular movement of the guide and spacing means 70 are transferred to the tip end of the scraper. In order to adapt the axial position of the entire scraper to axial displacement of the tip end 75, its base end 74 is displaceable along the axis 79, preferably by sliding along the shaft 81. Thus, the risk of the scraper damaging the filter cloth is set aside by the scraper—like a cam—following axial and radial movements of the filter elements.

Figure 9:
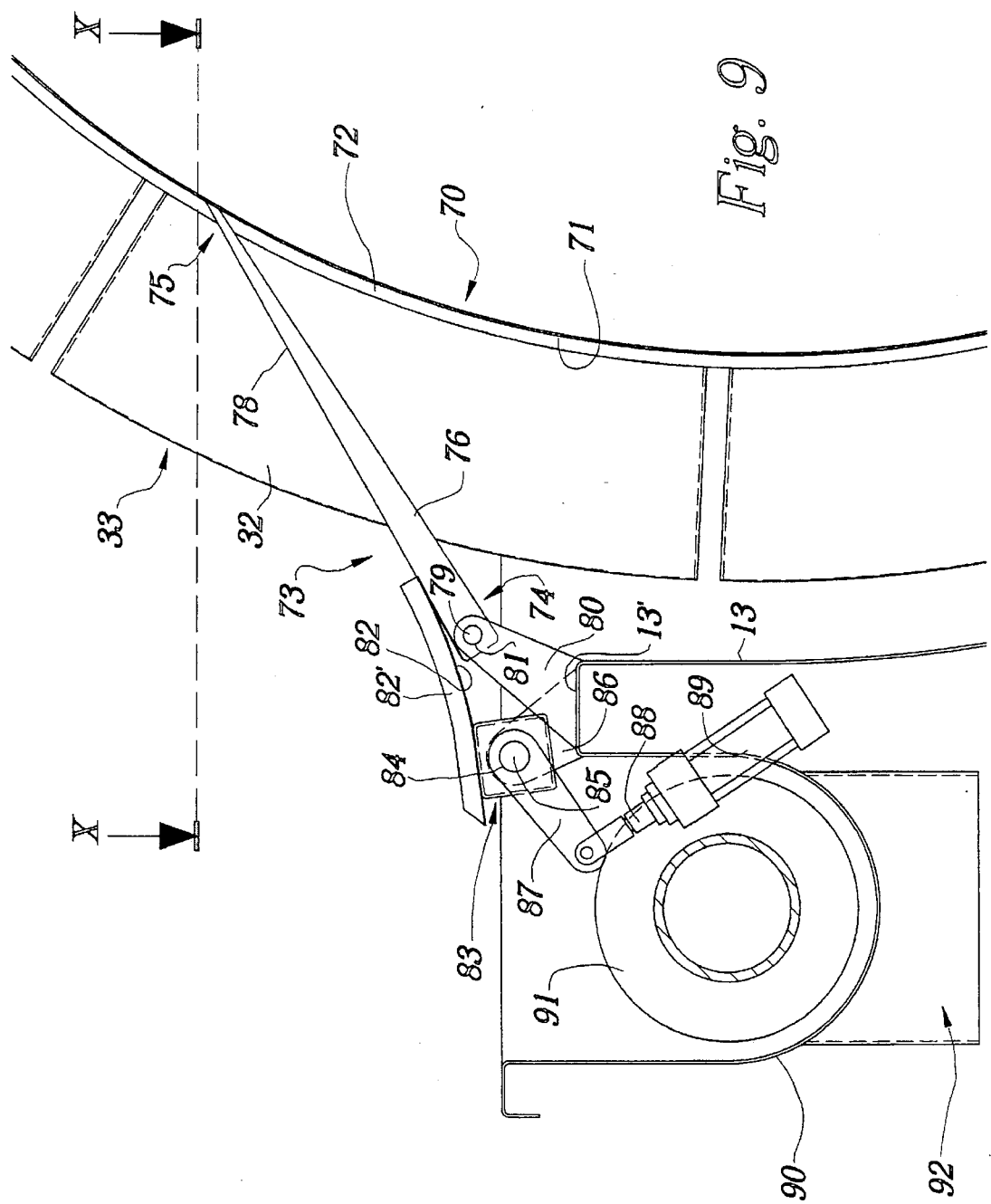
FIG. 9 is an enlargement of a portion of FIG. 8.

In order to apply an adequate pressure of the tip end 75 against the web portion 71, the scraper is resiliently biassed in a corresponding direction. In the embodiment shown, one end of an elastic sheet metal plate 82 is attached, e.g., spot welded, to the web portion 78 of the scraper at a position between the axis 79 and the tip end 75. An opposed end of the plate 82 is attached to a means 83 rigidly connected to a shaft 84, the axis 85 of which is parallel to the axis 79. The shaft 84 is journalled in at least one second bracket 86 attached to the upper edge 13' of the side wall portion 13. One end of a lever 87 is rigidly connected to the shaft 84 and the other end thereof is linked to the piston rod 88 of a cylinder 89 which is pivotably carried by a stationary part of the filter in a manner not particularly shown. Actuation of the cylinder 89 so as to extend the piston rod 88, turns the lever 87, the shaft 85 and the means 83 in a clockwise direction causing the plate 82 to bend as indicated in FIG. 9 and thereby to exert a resilient momentum on the scraper 73. By adjusting the piston stroke of the cylinder 89, a desired biassing force may be set at the tip end of the scraper. Alternatively, by retracting the piston rod 88 the scraper may be raised from its engagement in the channel of the U-shaped guide and spacing means 70.

Figure 10:
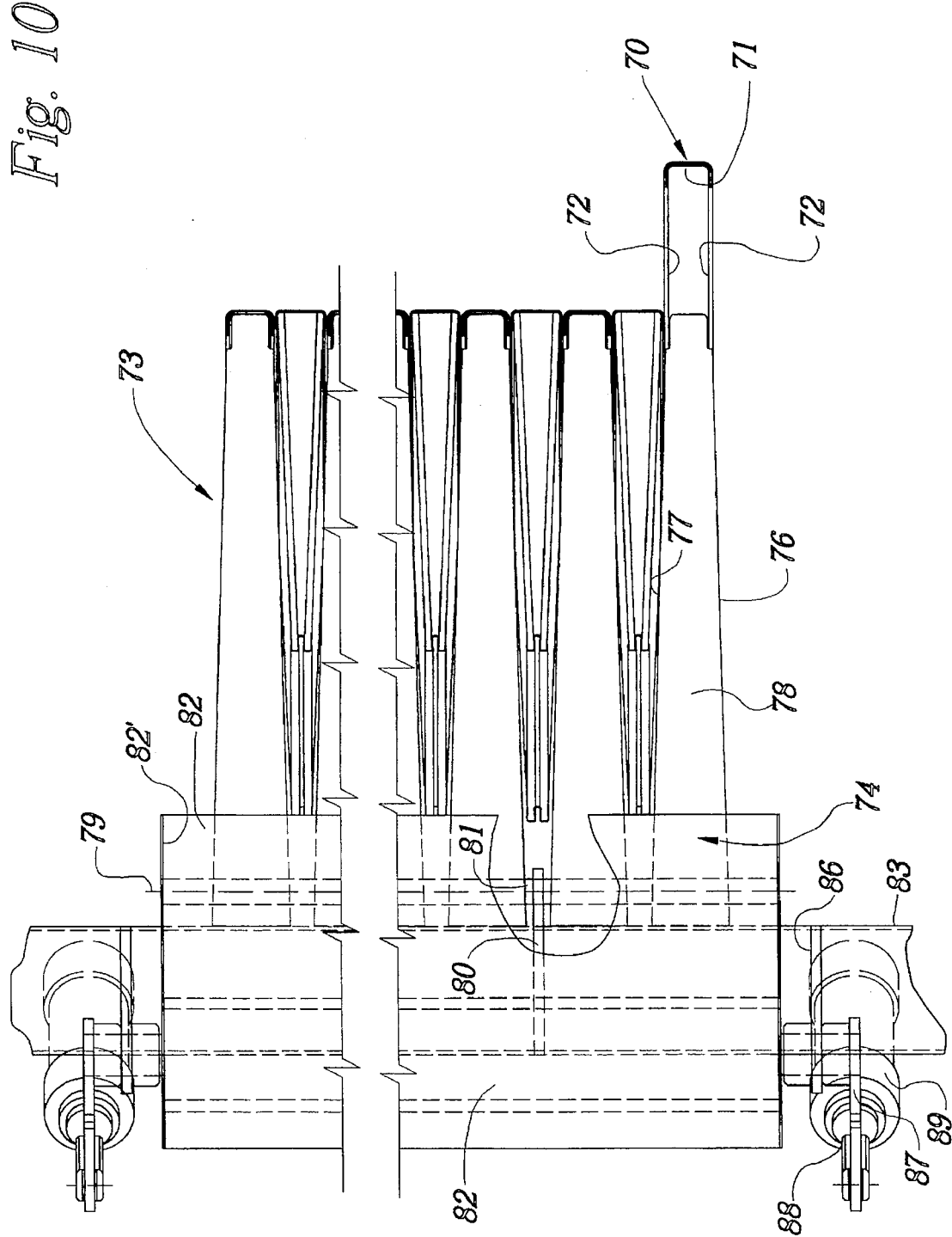
FIG. 10 is a section along line X—X in FIG. 9.

Advantageously, and as seen in FIG. 10, a plurality of scrapers 73 are connected to one axially extended plate 82, and one axially extended means 83 is connected no the plate 82. Preferably, scrapers 73 associated to all rings of filter elements of the filter are connected to one plate 82, see FIG. 11) and the means 83 extends beyond the ends of the plate 82 to be connected to respective levers 87, piston rods 88 and cylinders 89, as seen in FIG. 9. The axial ends of the plate 82 are bent so as to form upwardly directed stiffening flanges 82'. In order to provide torsional and bending resistance, the means 83 has a relatively large cross-section, in FIG. 9 represented as a substantially square cross-section.

According to the present invention, apart from serving as resilient means in blessing the scrapers, the plate 82 also serves as a chute for filter cake material removed from the filter elements by the scrapers. For that purpose, the plate extends radially outwards from relatively close to the outer circumferences of the rings of filter elements to terminate beyond the means 83 above a trough 90 extending along the filter, as seen in FIG. 11. A rotatable discharge screw 91 extends along the bottom of the trough to bring filter cake material towards an outlet 92.

The operation of the filter as now described is the following: A liquid or suspension to be filtered is introduced into the container 11 through the inlets 15 and 16 at either ends thereof. Such introduction from both ends ensures an even distribution of the liquid throughout the container. Advantageous distribution of the liquid is further improved due to the fact that the rotor structure is open at both ends enabling the liquid to enter the interior of the rotor structure where the spokes 21 as well as the axial filtrate channels 25 provide stirring of the liquid. Furthermore, one or more rings of filter elements may be omitted to provide an open space between adjacent rings of filter elements, as seen in FIG. 11, allowing liquid to pass from the interior to the exterior of the rotor struture, or, vice versa. The rotational direction of the filter is counterclockwise as indicated by an arrow A in FIG. 8. During rotation of the rotor structure through a liquid contained in the container 11, solids of the liquid are deposited on the filter medium of the filter elements as filtrate passes therethrough to be discharged as previously described. The solids form a filter cake on the filter elements which is partly dried during further rotation of the rotor structure above the surface of the liquid. When adjacent filter elements covered with filter cake reach the tip end 75 of a scraper 73, the tip end starts to shovel or scrape the filter cake off the bottom or web portion 71 of the U-shaped guide means 70. Further rotation brings the facing sides of adjacent filter elements close to the lateral edges of the web portion 78 of the scraper resulting in removal of filter cake material deposited thereon. Removed filter cake material slides along the web portion 78 of the scraper and ends up on the chute plate 82, slides therealong and falls down into the trough 90 to be moved by the discharge screw 91 towards the outlet 92.

It is appreciated from the description above that removal of filter cake in a filter according to the present invention takes place in a new and particularly reliable manner. Particularly, the formerly existing risk of damaging the filter cloth when utilizing mechanical removal of filter cake from filters having ridged filter cloth has been eliminated. This, in turn, enables an increase of the rotational speed and, thereby, of the filtering capacity.

Figure 12:
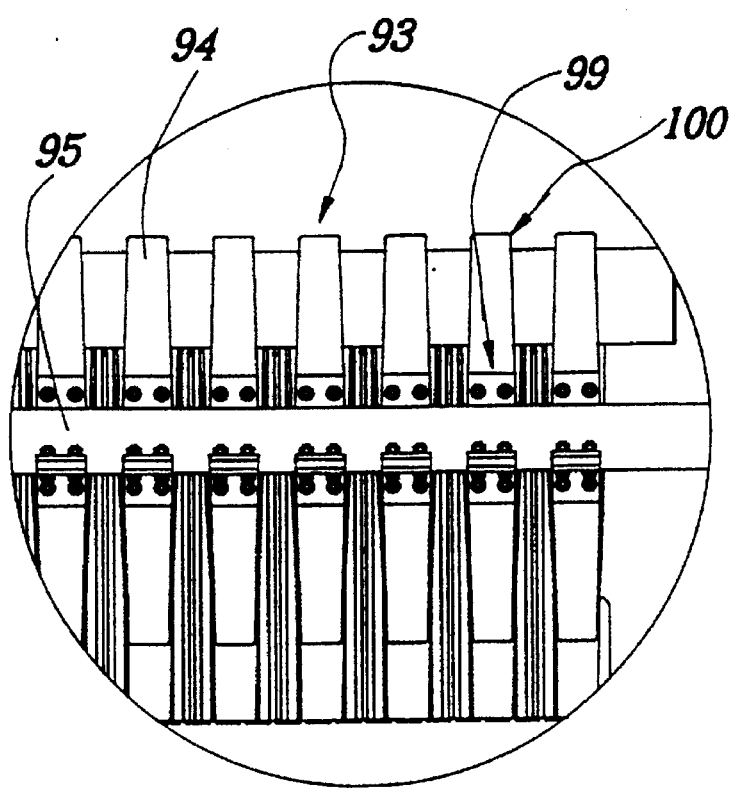
FIG. 12 is the encircled portion XII of FIG. 11 at an enlarged scale.

To assist in the removal of filter cake material, further removal means may be provided. In the embodiment shown in FIGS. 8, 11 and 12, such removal means comprise rotatable removal means 93 operative to remove filter cake material from facing filtering surfaces of adjacent filter elements. Each rotatable removal means 93 includes a number of fingers 94, in the embodiment shown four fingers, mounted on a shaft 95 in axial positions therealong corresponding to the axial positions of the scrapers 73 along the shaft 81. The shaft 95 is parallel to the shaft 17 and extends radially outside the outer circumferences of the rings of filter elements and above the scrapers 73 between bearings 96, 97 provided in the end walls 9, 10 of the container 11. One end of the shaft is provided with a keyway 98 for imparting rotational movement to the shaft. As best seen in FIG. 12, each finger is a flat member tapering from a base end 99 towards a tip end 100 and extending from the shaft 95 in between adjacent filter elements such that the lateral sides of the fingers pass close no the filter medium of the filter elements upon rotation of the shaft 95. The rotational direction of the shaft 95 is clockwise as indicated by an arrow B in FIG. 8, so that material removed from the filter elements by the fingers 94 is thrust along the respective scrapers 73 and towards the chute plate 82. Preferably, the tip ends 100 of the fingers 94 pass close to the planes 78 of the scrapers so as to positively bring along material resting thereon.

In FIGS. 8 and 11 is shown a further optional means useful in certain filtering applications where there is a need to treat the material deposited on the filter elements, such as bleaching or washing. This means includes a plurality of discus-like structures or wheels 101 mounted on a shaft 102 parallel to the shaft 17 and extending along the rings 33 of filter elements close to their outer circumference. The shaft 102 is freely rotatably journalled in bearings 103, 104 provided in the end walls 9, 10 of the container 11. Each wheel 101 has a radius extending substantially to the inner circumference of the rings of filter elements, i.e., to the ring-shaped guide means 70, and a substantially isosceles triangular diametrical section tapering from the shaft 102 towards its outer circumference. The wheels are distributed along the shaft such that one wheel is introduced between adjacent rings of filter elements with some clearance between the wheel sides and the sides of the filter elements. Although it is preferred that the wheels 102 rotate in unison with the shaft 102, they may be individually rotatable on the shaft 102 which, in such case, is unrotatably mounted in the end walls 9, 10.

For adaption to possible warping of the rings of filter elements and resulting axial movements thereof, the wheels may be axially displaceable along the shaft 102.

The purpose of a wheel 102 is to provide a seal between portions of its surfaces introduced between two adjacent rings of filter elements and the filter elements thereof such that a washing or bleaching liquid may be contained in a basin 105 formed and defined by the facing filtering surfaces of the filter elements, the ring-shaped guide means 70 and the wheel 102. Such washing or bleaching liquid is feed into spaces between adjacent filter elements by means not shown, and will soak and penetrate the filter cake deposited on the filter elements and then be withdrawn together with the filtrate.

In this application of the filter according to the present invention it is important to be able to connect the filter elements to vacuum during their passage through the washing or bleaching zone and to the removal means 73. Hereby is ensured that the treatment liquid penetrates the filter cake and has effect on its material.

Upon rotation of the rotor structure, the wheels will rotate in the direction indicated by an arrow C, driven by the frictional engagement between the wheel sides and the filter cake material deposited on the filter elements. Thus, filter cake material will continously be treated in the basin 105 as it passes therethrough.

The embodiment of a filter according to the present invention now described and shown particularly in FIG. 8, is a filter adapted for filtering cases where a high dry content of the filter cake is desired. This is achieved by locating the removal means on the side of the filter where the filter elements are about to be submerged into the liquid in the container after having been exposed to sub-pressure during a substantial portion of a revolution.

A further embodiment of the present invention is shown in FIG. 14. In this application the filter is adapted for filtering cases where a lower dry content is desired in the filter cake. The rotational direction A of the rotor structure is the same as in FIG. 8. In contrast to the embodiment of FIG. 8, however, removal means 106 are arranged on the side of the rotor structure where the filter elements leave the liquid in the container. It is evident that in this embodiment the removal means can not combine the scraping and discharge functions of the scraper 73 in one single member. Consequently, the removal means 106 comprises one scraper 107 and one discharge member 108. In all essential, the structure of the discharge member 108 corresponds to that of the scraper 73. However, the tip end of the discharge member is not engaged by the guide means 70 and its lateral edges are located at a greater distance from the respective side of adjacent filter elements than are the edges of the scraper 73 so as to permit filter cake deposited on the filter elements to pass the discharge member without being scraped-off. The scraper 107 is pivotedly mounted in the cover 11' above the discharge member so as to depend therefrom in an approximately vertical direction and so that its tip end may be engaged in the guide means 70. The lateral sides of the scraper are positioned close to the facing sides of adjacent filter elements. Filter cake material scraped-off by the scraper 107 falls down on the discharge member 108 to slide therealong onto an associated chute plate 109 and further down into a through 110 with a discharge screw 111 and an outlet 112.

I claim:

1. A filter for removing material suspended in a liquid, comprising:

a container for a liquid in which material is suspended;

a rotor structure arranged in the container and rotatable about a rotational axis having an outer circumference;

a filter medium provided on said outer circumference of said rotor structure and through which said liquid is filtered and on which said material is deposited as a filter cake during filtration, said filter medium being arranged in a shape corresponding to two substantially circular rings having facing filtering surfaces, said circular rings being substantially coaxial to said rotor structure and extending in a radial direction thereof substantially from said outer circumference of the rotor structure to a radially outer limit;

removal and discharge means arranged radially outside said outer periphery of said rotor structure and adapted to remove said filter cake from said filter medium and to direct said filter cake material radially outwards towards said radially outer limit of said filter medium;

guide means provided on said rotor structure and rotating therewith, said removal and discharge means and said guide means cooperating to keep said removal and discharge means at a preselected distance from said filter medium irrespective of the rotational position of said rotor structure, wherein said guide means is a guide ring coaxial to and mounted at said outer circumference of said rotor structure between said at least two circular rings, said guide ring including first surface means for slidably guiding said removal and discharge means in a radial direction relative to said filtering means, and second surface means for slidably guiding said removal and discharge means in an axial direction relative to said filtering means, said removal and discharge means simultaneously removing said filter cake from said facing filtering surfaces of both said rings of said filter medium.

2. A filter according to claim 1, wherein said removal and discharge means comprises a scraper means having a scraping edge (76, 77), and a surface for discharging removed filter cake.

3. A filter according to claim 1, wherein said removal and discharge means comprises a separate scraper means having at least one scraping edge, and a separate discharge means having a surface for discharging removed filter cake.

4. A filter according to claim 1, wherein said removal and discharge means comprises a rotatable means.

5. A filter according to claim 1, wherein said removal and discharge means comprises a combination of scraper means and rotatable means.

6. A filter according to claim 4, wherein said rotatable means comprises a plurality of scraper and discharge means arranged around a rotatable shaft.

7. A filter according to claim 5, wherein said rotatable means comprises a rotatable shaft and a plurality of scraper and discharge means arranged around said rotatable shaft.

8. A filter according to claim 1, wherein said rotor structure is substantially liquid tight between adjacent rings of filter medium of each group but liquid permeable between said groups.

9. A filter according to claim 1, wherein said rotor structure is open at least at one end.

10. A filter according to claim 1 wherein said container has at least one end wall having an inlet for said liquid to be filtered.

11. A filter according to claim 1, wherein said rotor structure carries at said outer circumference a plurality of filter elements communicating through axial filtrate conduits in said rotor structure with a filtrate outlet of said filter, each of said filter elements substantially having a shape corresponding to a ring segment, and said filter elements constituting at least one substantially closed filter ring, wherein each of said axial filtrate conduits has a side trailing at rotation of said rotor structure, said side inclining towards said filtrate outlet in rotational positions of said rotor structure in which a filter element associated with a particular conduit has moved into a position over the liquid surface and the filtrate conduit is located at least close to a horizontal plane through said rotational axis of said rotor structure.

12. A filter according to claim 1, wherein said guide ring has a substantially U-shaped cross-section, said first surface means comprising a web portion of said guide ring and said second surface means comprising spaced, radially outwardly directed flanges of said guide ring.

13. A rotating, filter according to claim 1, wherein said outwardly directed flanges slidably guide said removal and discharge means in one axial direction each.

14. A rotating filter according to claim 12, wherein said outwardly directed flanges slidably guide said removal and discharge means in one axial direction each.

15. A filter according to claim 1, wherein said removal and discharge means comprises a scraper means having a scraping edge and a surface for discharging removed filter cake.

16. A filter according to claim 12, wherein said removal and discharge means comprises a scraper means having a scraping edge and a surface for discharging removed filter cake.

17. A filter according to claim 13, wherein said removal and discharge means comprises a scraper means having a scraping edge and a surface for discharging removed filter cake.

18. A filter according to claim 14, wherein said removal and discharge means comprises a scraper means having a scraping edge and a surface for discharging removed filter cake.

* * * * *